Oct. 29, 1929.  J. B. ROBERTSON ET AL  1,733,170
BAT FORMING MACHINE
Filed Dec. 31, 1927    2 Sheets-Sheet 2
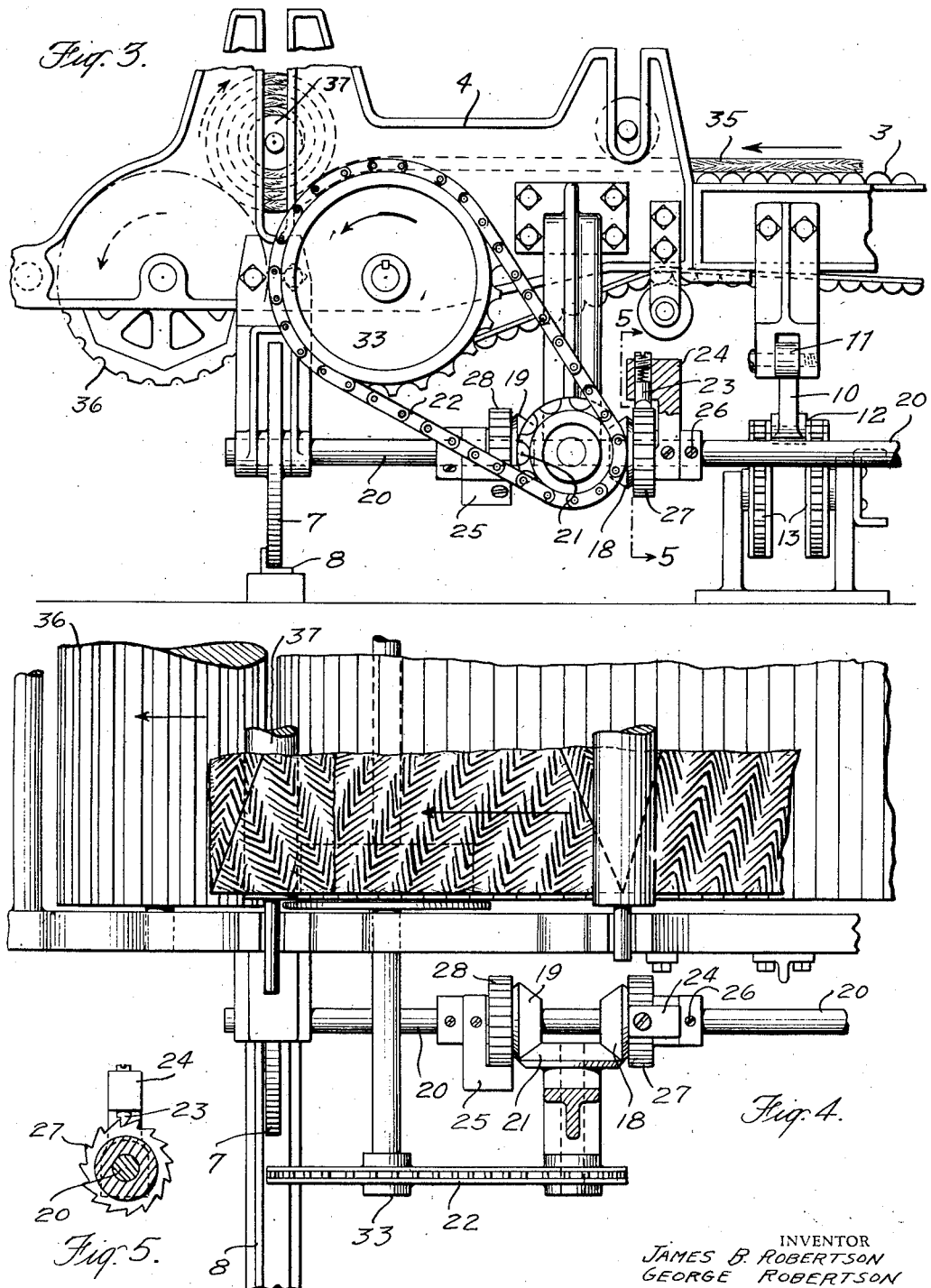
INVENTOR
JAMES B. ROBERTSON
GEORGE ROBERTSON
BY
ATTORNEY Patented Oct. 29, 1929

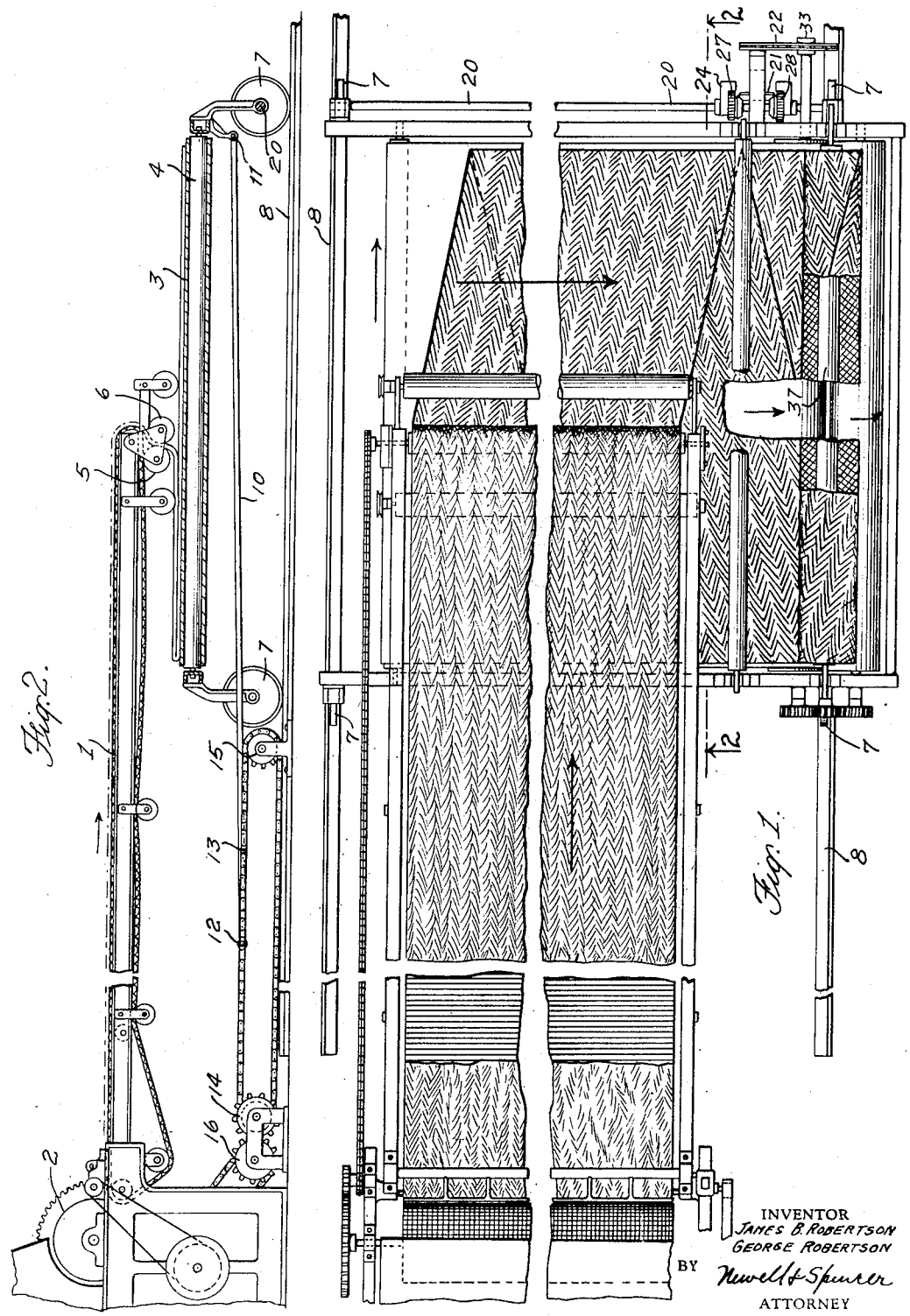

1,733,170

UNITED STATES PATENT OFFICE

JAMES BAXTER ROBERTSON, OF PATERSON, AND GEORGE ROBERTSON, OF RIDGEWOOD, NEW JERSEY, ASSIGNORS TO THE PARATEX CORPORATION, OF PATERSON, NEW JERSEY, A CORPORATION OF NEW JERSEY

BAT-FORMING MACHINE

Application filed December 31, 1927. Serial No. 243,798.

This invention relates to mechanical elements and particularly to operating elements for continuously moving the conveyer of a blamire such as may be used in connection with garnetting machines for forming a "bat" of the fiber for use in the manufacture of textiles or rugs.

Blamires ordinarily consist of a carriage which moves back and forth beneath a feeding conveyer which delivers fiber from a garnetting machine or other device in the form of a layer. The blamire carries a conveyer movable at right angles to the feeding conveyer so that the fiber is delivered to the conveyer of the blamire in overlapping layers placed on the conveyer in a zig-zag manner. Ordinarily the movement of the blamire conveyer is effected by means of a slotted lever connected to the blamire carriage and engaging a stationary pin. The movement of the carriage back and forth thus causes the blamire conveyer to be moved forward during a portion of the movement of the blamire. However, since the angle of the lever with reference to the carriage is small at the beginning and end of the carriage travel and the lever moves lengthwise relative to the pin, the conveyer is moved slowly or not at all at the ends of the carriage travel and relatively fast during the center portion of its travel with the result that the "bat" is considerably thicker at the edges than in the middle. It is important that the movement of the blamire conveyer be governed by the movement of the blamire in order that every portion of the "bat" of fiber produced may be of uniform thickness.

One of the objects of the present invention is to form a "bat" of uniform thickness throughout.

Another object of the invention is to increase the speed of operation of blamire machines.

Another object of the invention is to operate the blamire conveyer continuously as long as the blamire is in motion.

A further object of the invention is to provide simple mechanical elements which will convert oscillatory motion into continuous motion in one direction.

An outstanding feature of the invention resides in a mechanical connection between the shaft carrying the wheels which support the blamire and the blamire conveyer, which causes the blamire conveyer to be moved forward at all times when the blamire is in motion.

Another feature of the invention resides in the use of two oppositely faced ratchets for converting an oscillating motion into continuous motion in one direction.

Other important features and objects of the invention will be apparent from the following description and drawings, in which Figure 1 is a plan view of a blamire machine embodying the present invention;

Figure 2 is a vertical sectional view of the device shown in Figure 1 taken on the line 2—2 of Figure 1;

Figure 3 is a detailed view of certain parts of the driving mechanism;

Figure 4 is a plan view of the mechanism illustrated in Figure 3; and

Figure 5 is a detailed view taken on the line 5—5 of Figure 3.

The invention as illustrated in the drawings comprises a garnetting or similar machine having a feeding conveyer 1 for delivering fiber in a layer to be spread upon the conveyer 3 of the blamire 4. The layer of fiber passes over the end of the feed conveyer 1 and between the positively driven rollers 5 and 6. The feed conveyer may be supported from above or in any suitable manner and is stationary with reference to the garnetting machine 2. The blamire 4 is supported upon wheels 7 running upon a track 8 and is designed to move backward and forward beneath the feed conveyer toward and away from the garnetting machine 2. The oscillating motion of the blamire 4 is effected by means of the rod 10 secured to the blamire carriage at the point 11 the opposite end of the rod being attached at the point 12 to a chain 13 passed over gears 14 and 15 and positively operated by means of a gear 16 of the garnetting machine 2. As the upper portion of the chain 13 moves to the right, the blamire 4 is moved outwardly away from the garnetting machine 2, and as the point 12 of the chain 13 to which the rod 10 is secured passes around the gear 15 and moves to the left, the blamire 4 is drawn toward the garnetting machine 2 until the point 12 in the belt 13 reaches the gear 14. As the blamire 4 reciprocates in this manner beneath the feed conveyer 1 the wheels 7 supporting the blamire are moved first in one direction and then in the reverse direction. The blamire conveyer 3 upon which the layer of fiber from the feed conveyer 1 is deposited is moved in a direction at right angles to that of the feed conveyer 1, as shown in Figure 1 of the drawings.

The movement of the blamire conveyer 3 is effected by means of bevel gears 18 and 19 which are mounted so as to rotate freely upon the shaft 20, to which the wheels 7 are secured. The bevel gears 18 and 19 mesh with a drive gear 21 from which a belt or chain 22 extends to a gear 33 for moving the conveyer 3. The loosely mounted gears 18 and 19 are caused to rotate with the shaft 20 by means of spring pressure ratchets 23 mounted in the supports 24 and 25 which are rigidly secured to the shaft 20 by means of screws or pins 26. Thus, as the shaft 20 rotates in one direction, the ratchet 23 mounted in the support 24 rotates with the shaft and engages the teeth of a pawl 27 formed integral with the gear 18. When the blamire has reached the end of its outward movement and is moved backward toward the garnetting machine 2, the rotation of the wheels 7 and the shaft 20 is opposite to its previous motion and the ratchet 23 in the support 24 moves backward over the teeth of the pawl 27 without rotating the gear 18. The gear 19, however, is then rotated in a direction opposite to the previous movement of the gear 18 by reason of the oppositely-faced ratchet 23 in the support 25 which engages the pawl 28 formed integral with the gear 19. The gear 19 is positioned on the opposite side of the gear 21 from gear 19 so that the rotation of gear 21 is continuous in one direction. Thus, it is seen that when the shaft 20 rotates in one direction the gear 18 is positively driven from the shaft 20 to cause the conveyer 3 to be moved in the direction of the arrow in Figure 3, and when the shaft 20 rotates in the opposite direction the gear 19 is rotated in the opposite direction from that in which the gear 18 was previously operated but since the gear 19 is on the opposite side of the gear 21 the rotation of the gear 21 will be continuous and in a counter-clockwise direction, as shown in Figure 3. In this way, as the blamire is given a reciprocating motion and the shaft 20 upon which the wheel 7 supporting the blamire are mounted is moved in first one direction and then in the other, the gear 33 which is driven from gear 21 to move the conveyor 3 is given continuous movement in the direction of the arrow shown in Figure 3. The "bat" of fiber 35 laid upon the blamire conveyer 3 is removed from the conveyer by means of an engaging drum 36 which causes the "bat" to be coiled upon a roller 37 from which it may later be removed as required for use.

From the foregoing description of the invention it will be apparent that the supporting members 24 and 25 secured to the shaft 20 together with the ratchets 23 and the loosely mounted gears 18 and 19 operate to convert the oscillatory movement of the shaft 20 into continuous motion of the gear 21 in one direction.

The mechanical elements presented in the present invention may have other applications than for use in a blamire and it is not intended by the foregoing illustrative embodiment of the device to restrict the invention to the specific form set forth in the foregoing description.

What is claimed as new is:

1. A bat forming machine comprising a feeding conveyer, a carriage supported upon rotatable means, means for moving said carriage back and forth beneath said feeding conveyer, a conveyer on said carriage and means connected with said rotatable members for moving the conveyer carried by said carriage forward when said carriage is moved in either direction.

2. A bat forming machine comprising a feeding conveyer, a carriage located beneath said feeding conveyer and mounted upon rotatable means secured to a shaft, means for moving said carriage with reference to said feeding conveyor, a conveyer on said carriage and means driven from said shaft for moving forward the conveyor on said carriage.

3. A bat forming machine comprising a feeding conveyer, a blamire located beneath said feeding conveyer and movable back and forth at right angles to said feeding conveyer, said blamire being mounted upon rotatable means secured to a shaft, a blamire conveyer on said blamire, means driven from said shaft for moving said blamire conveyer forward when said blamire is moved in one direction and separate means for moving said conveyer forward when said blamire is moved in the opposite direction.

4. A bat forming machine comprising a feeding conveyer, a blamire located beneath said feeding conveyer and movable back and forth at right angles to said feeding conveyer, said blamire being mounted upon rotatable means secured to a shaft, a blamire conveyer on said blamire, ratchet means driven from said shaft for moving said blamire conveyer forward when said blamire is moved in one direction, and a second ratchet means for moving said conveyer forward when said blamire is moved in the opposite direction.

5. A bat forming machine comprising a feeding conveyer, a blamire located beneath said feeding conveyer and movable back and forth at right angles to said feeding conveyer, said blamire being mounted upon rotatable means secured to a shaft, a blamire conveyer on said blamire, gears loosely mounted upon said shaft and a ratchet and pawl connection between each of said gears and said shaft and a driving connection between said gears and said blamire conveyer so that as said blamire is moved in one direction one of said gears will rotate with said shaft to move said blamire conveyer forward and when said blamire moves in the opposite direction another of said gears will be connected with said shaft to move said blamire conveyer forward.

6. A bat forming machine comprising a feeding conveyer, a blamire located beneath said feeding conveyer and movable back and forth at right angles to said feeding conveyer, said blamire being mounted upon rotatable means secured to a shaft, a blamire conveyer on said blamire, gears loosely mounted upon said shaft and a ratchet and pawl connection between each of said gears and said shaft, and a drive gear positioned between said gears for moving said blamire conveyer so that as said blamire is moved in one direction one of said gears will rotate with said shaft to move said blamire conveyer forward and when said blamire moves in the opposite direction another of said gears will be connected with said shaft to move said blamire conveyer forward.

Signed at Paterson, N. J., this 15th day of December, 1927.

GEORGE ROBERTSON.
JAMES B. ROBERTSON.